(12) United States Patent
Okanaka et al.

(10) Patent No.: US 6,390,458 B2
(45) Date of Patent: May 21, 2002

(54) FLUID-FILLED ELASTIC MOUNT WHOSE ORIFICE PASSAGE HAS SUFFICIENTLY LARGE CROSS SECTIONAL AREA EXHIBITS IMPROVED FLUID-TIGHTNESS

(75) Inventors: Takehiro Okanaka, Kasugai; Hiroaki Tanahashi, Nishikasugai-gun, both of (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 09/781,565

(22) Filed: Feb. 9, 2001

(30) Foreign Application Priority Data

Feb. 21, 2000 (JP) ........................................ 2000-042870

(51) Int. Cl.$^7$ ................................................. F16F 5/00
(52) U.S. Cl. ................................................. 267/140.11
(58) Field of Search ................. 267/140.11, 140.12, 267/140.13, 140.14; 138/44, 146, DIG. 3

(56) References Cited

U.S. PATENT DOCUMENTS

| | | |
|---|---|---|
| 5,171,214 A | 12/1992 | Kolber |
| 5,259,598 A | 11/1993 | Hibi et al. ................... 267/140 |
| 5,368,578 A | 11/1994 | Covington et al. |
| 5,482,176 A | 1/1996 | Maietta |
| 5,718,346 A | 2/1998 | Weiler |
| 5,755,712 A | 5/1998 | Szempruch et al. |
| 5,775,666 A | 7/1998 | Tsukamoto et al. ......... 248/634 |
| 5,807,346 A | 9/1998 | Frezza |
| 5,817,082 A | 10/1998 | Niedospial et al. |
| 5,879,345 A | 3/1999 | Aneas |
| 5,890,610 A | 4/1999 | Jansen et al. |
| 5,891,129 A | 4/1999 | Daubert et al. |
| 5,895,383 A | 4/1999 | Niedospial |
| 5,902,298 A | 5/1999 | Niedospial |
| 5,919,182 A | 7/1999 | Avallone |
| 5,921,966 A | 7/1999 | Bendek et al. |
| 5,989,227 A | 11/1999 | Vetter et al. |

FOREIGN PATENT DOCUMENTS

JP 8-128491 5/1996

OTHER PUBLICATIONS

U.S. application No. 09/635,044, Hiroaki Tanahashi, filed Aug. 4, 2000.

*Primary Examiner*—Pam Rodriguez
*Assistant Examiner*—C T Bartz
(74) *Attorney, Agent, or Firm*—Rossi & Associates

(57) ABSTRACT

A fluid-filled elastic mount including an elastic body elastically connecting a first mounting member and a cylindrical second mounting members for fluid-tightly closing one open end of the second mounting member, a partition and a closure members superposed on each other and fixed at their peripheral portions to the other open end of the second mounting member, by calking, to provide on one side of the partition member a pressure receiving chamber partially defined by the elastic body and on the other side of the partition member an equilibrium chamber partially defined by a flexible diaphragm fixed to the closure member. These chambers are filled with a non-compressible fluid. The partition member has a cylindrical positioning shoulder, while the closure member has a cylindrical wall portion which is press-fitted onto the positioning shoulder of the partition member, so that the partition and closure member are positioned relative to each other in their diametric direction. The partition member also has an axial protrusion extending in its circumferential direction and diametrically opposed to the cylindrical wall portion of the closure member with a radial spacing therebetween to define an annular passage, and a partition wall disposed at a circumferential portion of the annular passage to fluid-tightly intercept the annular passage. The annular passage is held in fluid communication with the pressure-receiving chamber through a first communication hole formed on one side of the partition wall and with the equilibrium chamber through a second communication hole formed on the other side of the partition wall, to serve as an orifice passage.

14 Claims, 5 Drawing Sheets

FLUID-FILLED ELASTIC MOUNT WHOSE ORIFICE PASSAGE HAS SUFFICIENTLY LARGE CROSS SECTIONAL AREA EXHIBITS IMPROVED FLUID-TIGHTNESS

BACKGROUND OF THE INVENTION

1. Field of the Invention

The present invention relates generally to a fluid-filled elastic mount adapted to provide a vibration damping effect on the basis of flows of a fluid filling the fluid chamber thereof. More particularly, the present invention is concerned with such a fluid-filled elastic mount that is novel in construction and which is suitably used as an engine mount, a body mount or other mounts for an automotive vehicle.

2. Description of the Related Art

As one type of a vibration damping device such as a vibration damping coupling (bushing) or mount, which is interposed between two members of a vibration system for flexibly connecting these two members or mounting one of these members on the other member in a vibration damping manner, there is known a fluid-filled elastic mount wherein a first metallic mounting member and a second metallic mounting member having a hollow cylindrical configuration are spaced apart from each other such that the first mounting member is disposed on the side of one of opposite open ends of the second mounting member, and are elastically connected to each other by an elastic body, whereby the one open end of the second mounting member is fluid tightly closed by the elastic body. The other open end of the second mounting member is fluid tightly closed by a flexible rubber diaphragm, to thereby define a fluid chamber between the elastic body and the flexible diaphragm, which is filled with a non-compressible fluid. The fluid-filled elastic mount further includes a metallic partition member supported by the second mounting member, which is adapted to divide the fluid chamber such that a pressure-receiving chamber which is partially defined by the elastic body is formed on one side of the partition member, while a variable-volume equilibrium chamber which is partially defined by the flexible diaphragm formed on the other side of the partition member. These pressure receiving and equilibrium chambers communicate with each other by an orifice passage. Upon application of vibrational loads between the first and second mounting members, a pressure of the fluid in the pressure receiving chamber changes due to elastic deformation of the elastic body, generating a pressure difference of the fluid between the pressure receiving and equilibrium chambers. Based on this pressure difference of the fluid, the non-compressible fluid forcedly flows through the orifice passage between the pressure receiving and equilibrium chambers, so that the fluid-filled elastic mount can exhibits an excellent vibration damping effect, owing to resonance or flows of the fluid flowing through the orifice passage. In the light of this excellent vibration damping effect, the elastic mount of this type is favorably used as an engine mount or a body mount for an automotive vehicle, for example.

Such a fluid-filled elastic mount can exhibit a desired vibration damping effect based on the resonance or flows of the fluid flowing through the orifice passage, by suitably tuning or determining a length and a cross sectional area of the orifice passage. In order to exhibit the excellent vibration damping effect of the elastic mount, the orifice passage needs to be made longer enough to assure a sufficiently large amount or mass of the fluid flowing through the orifice passage. To this end, the orifice passage may be conventionally constructed by using the partition member and an annular closure member made of metal, which is bonded at its outer peripheral portion to the periphery of the flexible diaphragm upon vulcanization of a rubber material for forming the flexible diaphragm. The annular closure member and the partition member are superposed on each other and fixed by calking at their peripheral portions to the other open end portion of the second mounting member which is remote from the first mounting member, to thereby define therebetween an annular passage extending in the circumferential direction thereof. The annular passage includes a partition wall formed at a circumferential portion thereof so as to fluid-tightly divide the annular passage in the circumferential direction, and a first and a second communication hole located on the opposite sides of the partition wall, so that the annular passage is held in fluid communication through the first and second communication hole with the pressure receiving chamber and the equilibrium chamber, respectively, thereby providing the orifice passage. According to this conventional structure of the orifice passage, the orifice passage is effectively and easily formed at the radially outward portion of the fluid chamber, so as to extend in the circumferential direction of the second mounting member with a circumferential length which is slightly smaller than the circumference of the second mounting member.

However, the conventional orifice structure may possibly suffer from a problem of insufficient fluid tightness at the partition wall portion, resulting in undesirable fluid communication between both ends of the orifice passage located on the opposite sides of the partition wall. This drawback makes it impossible to obtain a desired length of the orifice passage, resulting in deterioration of the vibration damping effect of the elastic mount.

To cope with the conventionally experienced problem, the present assignee has proposed an improved orifice structure as disclosed in JP-A-8-128491, wherein a partition wall made of an elastic body is formed at a circumferential portion of the annular passage so as to protrude from the partition member toward the closure member with a radial length which is reduced in a direction toward the closure member. That is, the partition wall has an inclined outer circumferential surface. The closure member is also arranged to have an inclined inner circumferential surface corresponding to the inclined outer circumferential surface of the partition wall. The inclined inner circumferential surface of the closure member is superposed on and forcedly pressed against the inclined outer circumferential surface of the partition wall, owing to the calking force applied between the partition and closure members. The inclined inner circumferential surface of the closure member which defines outer circumferential surface of the orifice passage inevitably causes undesirable reduction in the cross sectional area of the orifice passage, possibly leading to difficulty in assuring a required insufficient vibration damping effect of the elastic mount. Thus, the conventional fluid-filled elastic mount as descried above, still has some room for improvement.

SUMMARY OF THE INVENTION

It is therefore an object of the invention to provide a fluid-filled elastic mount which is novel in construction and which permits an easy formation of an orifice passage that is partially defined by and between a partition member and a closure member which are superposed on each other and fixed by calking to a second mounting member. The orifice passage extends in the circumferential direction of the partition and closure members with a circumferential length slightly smaller than a circumference of these members and with a sufficiently large cross sectional area. The orifice passage also exhibits an excellent fluid-tightness at a partition wall portion, thereby preventing undesirable fluid-leakage or fluid-communication between both ends of the orifice passage located on the opposite sides of the partition wall.

The above object of the invention may be achieved according to the principle of the invention, which provide a fluid-filled elastic mount including (a) a first mounting member and a generally cylindrical second mounting member, which are spaced apart from each other in an axial direction of the second mounting member, (b) an elastic body elastically connecting the first and second mounting members so as to fluid-tightly close one of axially opposite open ends of the second mounting member, (c) a partition member made of metal and extending in a direction perpendicular to the axial direction, (d) a closure member made of metal and having a central through hole and a flexible diaphragm fluid-tightly closing the central through hole, the partition member and the closure member being superposed on each other and fixed at their peripheral portions to the other of axially opposite open ends of the second mounting member, by calking, so as to provide on one of opposite sides of the partition member a pressure receiving chamber which is partially defined by the elastic body and filled with a non-compressible fluid, and on the other of opposite sides of the partition member an equilibrium chamber which is partially defined by the flexible diaphragm and filled with the non-compressible fluid, and (e) an orifice passage for fluid communication between the pressure receiving chamber and the equilibrium chamber, the orifice passage being formed between the partition and closure members so as to extend in a circumferential direction of the partition and closure members, wherein an improvement comprises: the partition member including an axial protrusion formed at a radially intermediate portion thereof and having an outer circumferential surface extending in the circumferential direction thereof, and a cylindrical positioning shoulder located radially inwardly of the peripheral portion thereof, the closure member including an integrally formed cylindrical wall portion located radially inwardly of and protruding axially outwardly from the peripheral portion thereof, and an integrally formed annular plate portion extending radially inwardly from a protruding open end portion of the cylindrical wall portion, the partition and closure members being superposed on each other such that the cylindrical wall portion of the closure member is partially press-fitted onto an outer circumferential surface of the cylindrical positioning shoulder of the partition member so as to be positioned relative to the partition member in a diametric direction thereof, and that the annular plate portion of the closure member being superposed at an inner peripheral portion thereof on a protruding end face of the axial protrusion of the partition member to thereby provide an annular passage partially defined by and circumferential extending between the cylindrical wall portion of the closure member and the axial protrusion of the partition member which are opposed to each other in the diametric direction, the annular groove including a partition wall formed at a circumferential portion thereof, the partition wall protruding radially outwardly from the side of the partition member toward the side of the closure member such that the partition wall is elastically pressed against the side of said closure member to thereby fluid tightly intercept the annular passage in a circumferential direction thereof; and the annular passage being held in fluid communication with the pressure receiving chamber through a first communication hole formed on one of circumferentially opposite sides of the partition wall and with the equilibrium chamber through a second communication hole formed on the other side of the partition wall, to serve as the orifice passage.

In the fluid-filled elastic mount of the present invention constructed as described above, the partition and closure members are superposed on and assembled with each other in the axial direction such that the cylindrical wall portion of the closure member is press-fitted onto the positioning shoulder of the partition member, so that the partition and closure members are fixed by calking to the second mounting member with these members positioned relative to each other in a substantially coaxial or concentric relationship. In this condition, the suitably dimensioned outer circumferential surface of the partition wall of the partition member and the suitably dimensioned inner circumferential surface of the cylindrical wall portion of the closure member are elastically pressed against each other with the partition wall compressed in the radial direction by a predetermined compression amount. Therefore, the engine mount of the present invention effectively and stably assures that the partition wall is held in elastically pressing contact at its outer circumferential surface with the inner circumferential surface of the outer cylindrical wall portion, without needing a specific operation for positioning the partition and closure members relative to each other in the diametric direction. In addition, with the thus assembled partition and closure members being fixed by calking to the second mounting member, an axial compression force caused by the calking acts on the interfaces between an axially protruding end face of the partition wall of the partition member and the annular plate portion of the closure member, so that the partition wall and the annular plate portion of the closure member are pressed against each other with high stability.

That is, the present engine mount assures the pressing contact of the partition wall with the cylindrical wall portion of the closure member with high stability, in the condition where the cylindrical wall portion of the closure member being press-fitted onto the positioning shoulder of the partition member, without requiring the specific operation for positioning the partition and closure members relative to each other in the diametrical direction. This makes it possible to substantially completely eliminate the conventionally experienced problem of the undesirable fluid-leakage or communication between both ends of the orifice passage, resulting in desired vibration damping effect of the engine mount based on the flows of the fluid flowing through the orifice passage, with high stability.

According to one preferred form of the present invention, the first and second communication holes are formed on the side of the partition member. This makes it possible to eliminate a requirement for positioning the partition and closure members relative to each other in the circumferential direction, leading to further improved efficiency of assembling the partition and closure members. For instance, the first communication hole may be effectively constituted by a through hole formed through the partition member, which is located on one of opposite sides of the partition wall in the circumferential direction, and which is also located radially inwardly of the positioning shoulder. This through hole allows one of circumferentially opposite ends of the orifice passage to communicate with the pressure-receiving chamber, thereby functioning as the first communication hole. The second communication hole, for example, may be effectively constituted by a small-diameter portion of the annular protrusion located on the other side of the partition wall. Namely, the outer circumferential surface of the axial protrusion, which partially defines an inner circumferential surface of the orifice passage, is partially retracted radially inwardly at a circumferential portion located on the other side of the partition wall. The small diameter portion of the annular protrusion allows the other end of the orifice passage to communicate with the equilibrium chamber, thereby functioning as the second communication hole.

In the present invention, the positioning shoulder of the partition member may possibly be formed of a rubber material, a resin material or other suitable materials, and fixedly secured to the partition member. Preferably, the positioning shoulder is integrally formed with the partition member. The positioning shoulder formed as an integral part of the partition member made of metal, permits a higher degree of stability and precision of the positioning of the partition and cylindrical members relative to each other, in comparison with the positioning shoulder formed of the elastic body or the resin material, resulting in a further improved degree of reliability in preventing the mutual communication between the both ends of the orifice passage.

According to another preferred form of this invention, the partition and closure members are both formed of a metallic material by pressing. This arrangement assures an improved efficiency and reduced cost of manufacture of these two members. For instance, the partition and closure members may be effectively formed of a ferrous metal or other metallic materials such as an aluminum alloy. Further, any other suitable operations other than the pressing operation may be employed for forming the partition and closure members.

According to a further preferred form of this invention, the partition member further includes a central through hole and an elastic movable plate fluid-tightly closing the central through hole, the elastic movable plate being elastically deformable based on a fluid pressure difference between the pressure receiving and equilibrium chambers, which fluid pressures act on opposite surface of the elastic movable plate, respectively. This elastic deformation of the elastic movable plate functions to offset or absorb the fluid pressure change in the pressure receiving chamber, upon application of the high frequency vibrations causing a substantially no flow of the fluid flowing through the orifice passage. In the presence of the elastic movable plate, the elastic mount according to this preferred form of the invention can exhibit an improved vibration damping effect with respect to the high frequency vibrations.

According to a still further preferred form of the present invention, the axial protrusion of the partition member is formed of a rubber material, and the partition wall is integrally formed with the axial protrusion. In this preferred form of the invention, the axial protrusion and the partition wall are formed as an integral elastic body. This arrangement is effective to provide the orifice passage which exhibits an improved fluid-tight sealing, and which is free from the problem of the fluid-leakage or fluid-communication between the both ends of the orifice passage, with high stability. In this case, the axial protrusion preferably includes a reinforcing plate embedded therein and formed as an integral part of the partition member, in order to assure desired stability and rigidity of the axial protrusion. When the partition member includes the elastic movable plate according to the aforementioned preferred form of the invention, preferably, the elastic movable plate is also integrally formed with the axial protrusion and the partition wall.

According to a yet further preferred form of this invention, there is provided a sealing rubber layer which is bonded to inner circumferential surfaces of the cylindrical wall portion and the annular plate portion of the closure member, and which is integrally formed with the flexible diaphragm, the closure member being press-fitted at the cylindrical wall portion thereof to the cylindrical positioning shoulder of the partition member via the sealing rubber layer, and being press-fitted at the annular plate portion thereof to the protruding end face of the axial protrusion of the partition member via the sealing rubber layer, the partition wall of the partition member being pressed against or being held in pressing contact with the closure member via the sealing rubber layer.

In this preferred form of the present invention, a clearance possibly formed between the partition and closure members due to the dimensional tolerances of the partition and closure members, is effectively absorbed by the sealing rubber layer interposed between and compressed by the partition and closure members, resulting in further improved fluid-tight sealing of the orifice passage. Preferably, the sealing rubber layer is used together with the axial protrusion and the partition wall, which are formed as the integral elastic body as in the aforementioned preferred form of the invention.

The positioning shoulder may have a generally cylindrical outer circumferential surface extending in the axial direction with a generally constant diameter. Alternatively, the positioning shoulder may have a tapered outer circumferential surface extending in the axial direction with a diameter gradually reduced in the axially extending direction thereof. In the latter case, the tapered positioning shoulder may further facilitate the operation for press-fitting the cylindrical wall portion of the closure member to the positioning shoulder. In the farmer case, the generally cylindrical outer circumferential surface may preferably be arranged to have a rounded edge at its protruding end face, so that the outer circumferential surface of the positioning shoulder functions as a guide surface along which the cylindrical wall portion of the closure member is pushed toward the partition member, upon press-fitting the closure member to the partition member.

According to a still yet further preferred form of this invention, the partition wall formed in the partition member may be dimensioned such that the outer circumferential surface of the partition wall is aligned in the axial direction with the outer circumferential surface of the positioning shoulder, or alternatively is retracted radially inwardly from the outer circumferential surface of the positioning shoulder with a slight amount of radial distance. Namely, the outer circumferential surface of the partition wall is located not to protrude radially outwardly from the outer circumferential surface of the cylindrical positioning shoulder. The cylindrical wall portion includes a local portion adapted to contact with the outer circumferential surface of the partition wall and protruding radially inwardly from the outer circumferential surface of the cylindrical positioning shoulder, so as to be elastically pressed against or to be held in pressing contact with the outer circumferential surface of the partition wall in the radial direction of the partition and closure members.

In this preferred form of the invention, a mold used for forming the partition wall by vulcanizing a rubber material, never has an overhang, resulting in improved efficiency in vulcanizing and pressing operations for manufacturing the partition and closure members.

BRIEF DESCRIPTION OF THE DRAWINGS

The above and other objects, features advantages and technical and industrial significance of the present invention will be better understood by reading the following detailed description of the present preferred embodiments or modes of the invention when considered in connection with the accompanying drawings in which.

DETAILED DESCRIPTION OF THE PREFERRED EMBODIMENT

Figure 1:
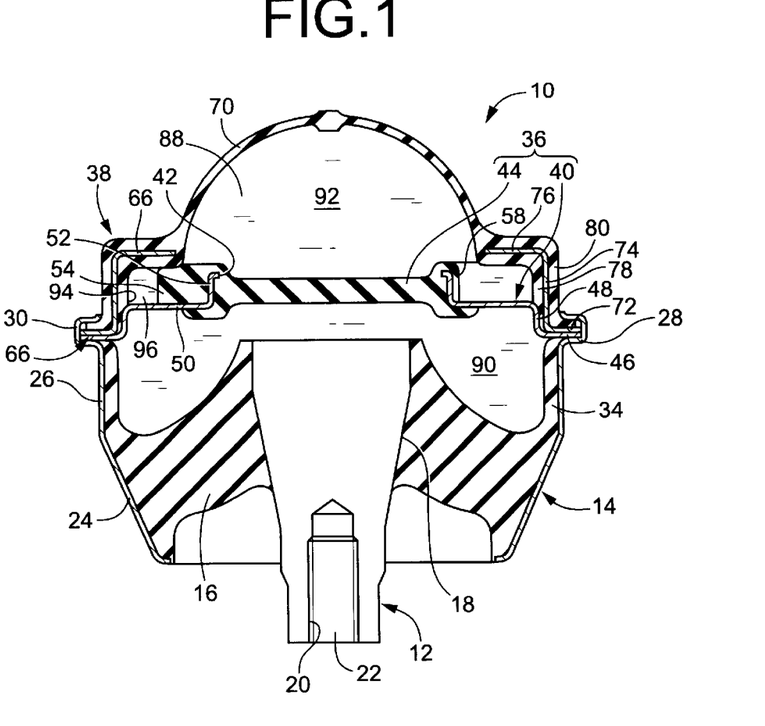
FIG. 1 is an elevational view in axial cross section of a fluid-filled elastic mount in the form of an automotive vehicle engine mount constructed according to one embodiment of this invention.

Referring first to FIG. 1, an engine mount 10 for an automotive vehicle is shown as one embodiment of the fluid-filled elastic mount of the present invention. This engine mount 10 includes an inner mounting member 12 as a first mounting member and an outer mounting member 14 as a second mounting member, which members 12, 14 are both made of metallic materials and are spaced apart from each other in their axial direction. The inner and outer mounting members 12, 14 are elastically connected to each other by an elastic body 16 interposed therebetween. The present engine mount 10 is installed on the vehicle such that the inner mounting member 12 is attached to the power unit of the vehicle (not shown), while the outer mounting member 14 is attached to the body of the vehicle (not shown), so that the power unit is suspended from the body in a vibration damping or isolating manner. The engine mount 10 is installed in position where the upper side of the engine mount 10 as seen in FIG. 1 is located radially inwardly of the lower side of the engine mount 10 as seen in FIG. 1. When the engine mount 10 is installed on the vehicle as described above, the weight of the power unit acts on the engine mount 10 in the vertical direction as seen in FIG. 1. This static load causes a certain amount of elastic deformation of the elastic member 16 so that the inner mounting member 12 is displaced by a suitable amount relative to the outer mounting member 14 in the vertically downward direction. The engine mount 10 receives a vibrational load primarily in the substantially vertical direction as seen in FIG. 1.

Described in detail, the inner mounting member 12 is a tapered solid cylindrical member whose diameter increases in an axially upward direction as seen in FIG. 1. Namely, the inner mounting member 12 includes an axially upper portion serving as a tapered portion 18 and an axially lower portion formed with a threaded hole 20 open in the axially lower end face of the inner mounting member 12. The inner mounting member 12 is attached to the power unit (not shown) by a bolt 22 which is screwed in the threaded hole 20.

The outer mounting member 14 is a thin walled generally hollow cylindrical member whose inner diameter is sufficiently larger than the outside diameter of the inner mounting member 12. The outer mounting member 14 includes at its axially lower half end a tapered portion 24 whose diameter is reduced in the axially downward direction as seen in FIG. 1, and at its axially upper half end a large-diameter portion 26 which extends in the axial direction with a generally constant inner and outer diameters. The large-diameter portion 26 includes a shoulder 28 integrally formed at its axially upper end potion so as to extend radially outwardly from the axially upper end portion. The shoulder 28 has a peripheral portion which is bent in an axially upward direction to thereby integrally form a calking portion 30 which extends in the axially upward direction with a cylindrical form.

The outer mounting member 14 is disposed radially outwardly of the inner mounting member 12 in substantially coaxial relationship with the member 12, with a given radial spacing therebetween, such that the axially lower end portion of the inner mounting member 12 protrudes axially outwardly from the outer mounting member 14.

Figure 2:
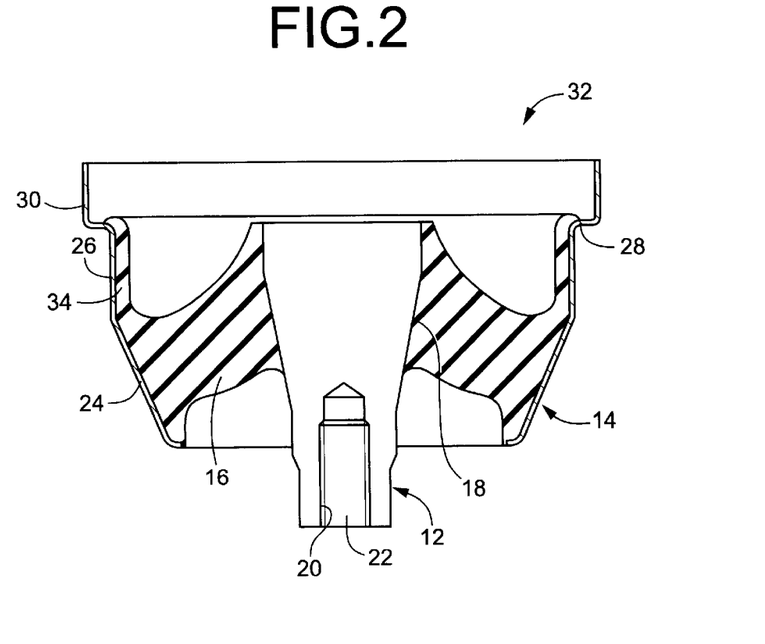
FIG. 2 is an elevational view in axial cross section of an integral vulcanized product used in the engine mount of FIG. 1.

With the inner and outer mounting member 12, 14 are disposed relative to each other as described above, the outer circumferential surface of the tapered portion 18 of the inner mounting member 12 and the inner circumferential surface of the tapered portion 24 of the outer mounting member 14 are opposed to each other, and are elastically connected to each other by the elastic body 16 which is interposed between and bonded to these opposite surfaces upon vulcanization of a rubber material for forming the elastic body 16. Thus, the inner and outer mounting members 12, 14 and the elastic body 16 elastically connecting these two members 12, 14 are provided as an integral vulcanized intermediate product 32. The elastic body 16 has a generally tapered thick-walled cylindrical shape, and is bonded at an inner circumferential surface thereof to the outer circumferential surface of the tapered portion 18 of the inner mounting member 12 and at an outer circumferential surface thereof to the inner circumferential surface of the tapered portion 24 of the outer mounting member 14.

With the elastic body 16 bonded by vulcanization to the inner and outer mounting members 12, 14 as described above, the small-diameter open end portion of the outer mounting member 14, i.e., the axially lower open end portion as seen in FIG. 1, is fluid tightly closed by the elastic body 16 and the inner mounting member 12. The inner circumferential surface of the outer mounting member 14 is substantially entirely covered by a sealing rubber layer 34 integrally formed with the elastic body 16 and bonded to the inner circumferential surface of the outer mounting member 14 upon vulcanization of a rubber material to form the sealing rubber layer 34.

On the other hand, the large-diameter open-end portion of the outer mounting member 14, i.e., the axially upper open end portion as seen in FIG. 1, is fluid tightly closed by a partition member 36 and a closure member 38 which are superposed in this order on the large-diameter open-end portion of the outer mounting member 14.

Figure 3:
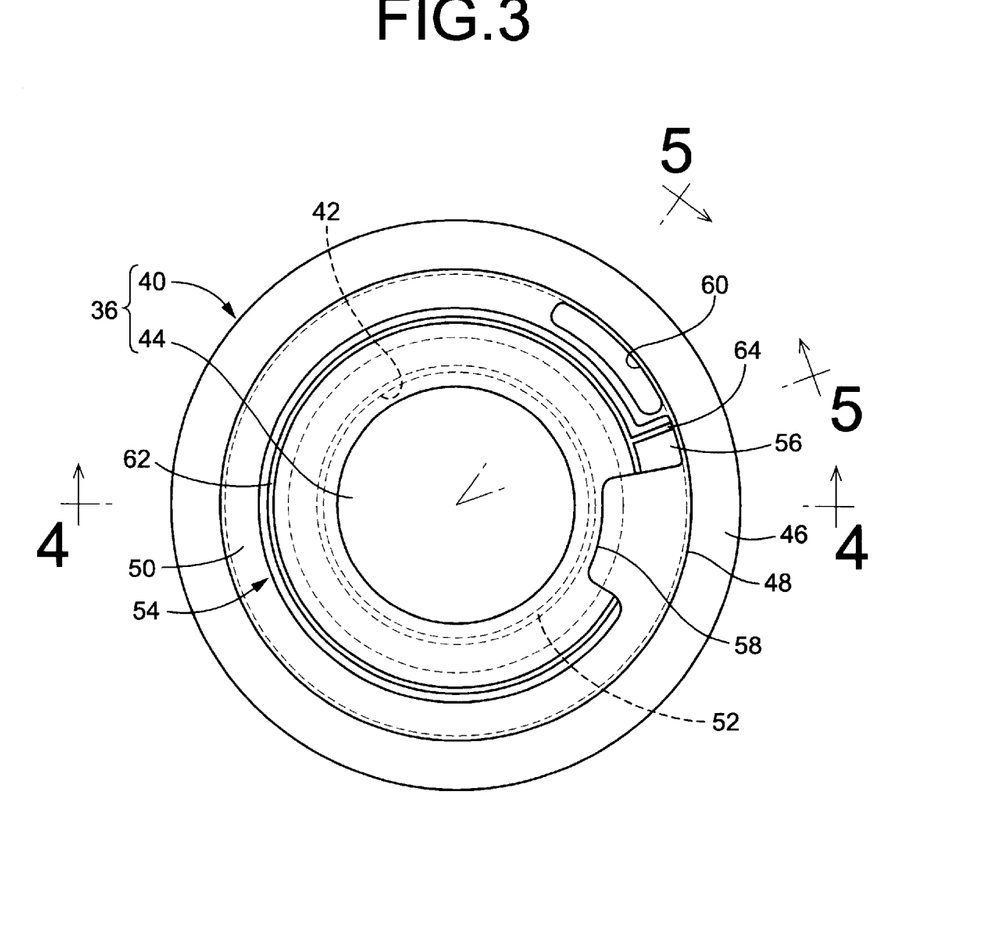
FIG. 3 is an elevational plane view of a partition member used in the engine mount of FIG. 1.
Figure 4:
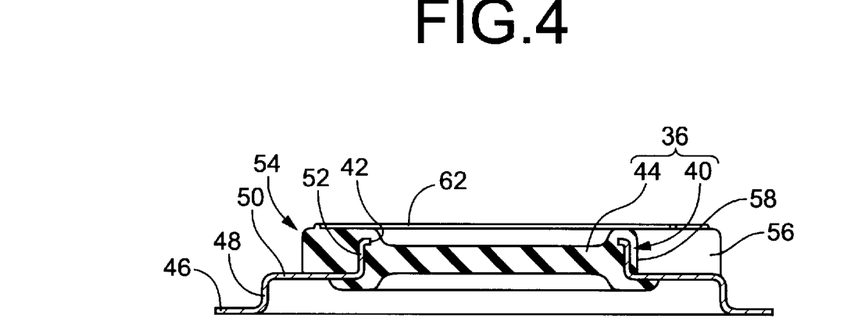
FIG. 4 is a cross sectional view of the partition member taken along line 4—4 of FIG. 3.
Figure 5:
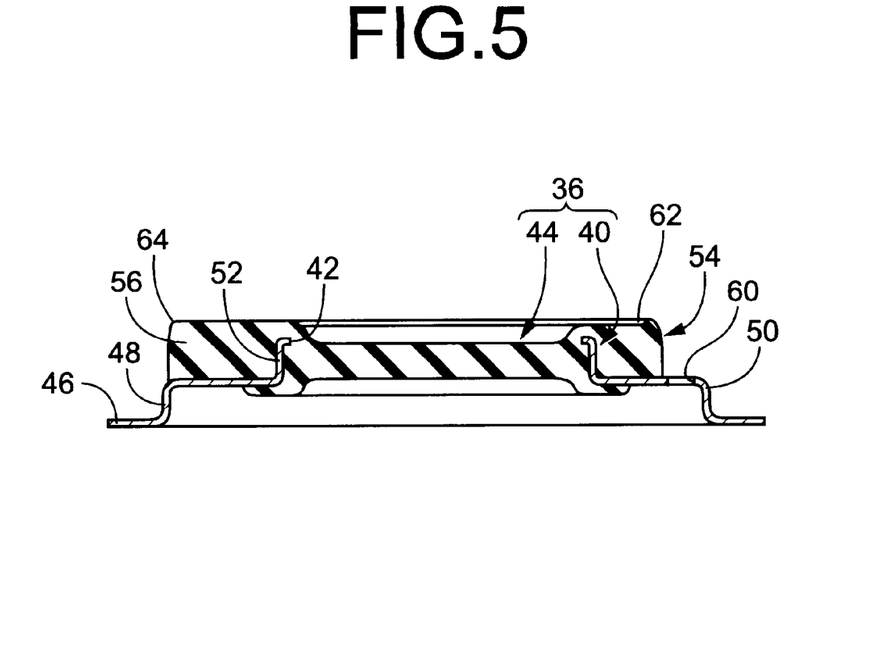
FIG. 5 is a cross sectional view of the partition member taken along line 5—5 of FIG. 3.

Referring next to FIGS. 3–5, the partition member 36 consists of a partition plate 40 made of metal and having an annular plate-like shape, and a movable rubber plate 44 for fluid-tightly closing a central opening 42 as a central through hole of the partition plate 40 which will be described later. The outer peripheral portion of the partition plate 40 serevs as an outward flange portion 46 having an annular plate-like shape. The inner peripheral portion of the outward flange portion 46 is bent at substantially right angle so as to protrude axially outward or upward direction, thereby providing a positioning stepped portion 48 having a cylindrical shape, as a cylindrical positioning shoulder. The protruding end portion of the positioning stepped portion 48 is bent at a substantially right angle so as to extend radially inward direction, thereby providing an annular bottom wall portion 50 having a relatively large width. The inner peripheral portion of the annular bottom wall portion 50 is also bent at a substantially right angle so as to protrude the axially upward direction, thereby providing a cylindrical inner wall portion 52. The protruding end portion of the cylindrical inner wall portion 52 is bent radially inwardly by a small amount of distance. The cylindrical inner wall portion 52 is bent radially inwardly by a small amount of distance. The cylindrical inner wall portion 52 defines the above-mentioned central opening 42 of the partition plate 40, which opening 42 have a relatively large diameter.

The movable rubber plate 44 has a disk-like shape with a generally constant wall thickness, and is bonded at its peripheral portion to the cylindrical inner wall portion 52 of the partition plate 40, upon vulcanization of a rubber material to form the movable rubber plate 44, to thereby fluid-tightly close the central opening 42 of the partition plate 40. The partition member 36 also includes an annular rubber block 54 disposed radially inner-half portion of the annular bottom wall portion 50 of the partition plate 40 and extending over the circumference of the annular bottom wall portion 50. The annular rubber block 54 is integrally formed with the peripheral portion of the movable rubber plate 44, and is bonded to the annular bottom wall portion 50 and the inner cylindrical wall portion 52, upon vulcanization of a rubber material to form the annular rubber block 54, so as to protrude in the axially upward direction from the annular bottom wall portion 50. That is, the annular rubber block 54 serevs as an axial protrusion of the partition member. In the present embodiment, the annular rubber block 54 and the movable rubber plate 44 are formed as an integral elastic body, and the inner cylindrical wall portion 52 of the partition member 36 is embedded within integral elastic body. That is, the inner cylindrical wall portion 52 of the partition plate 40 functions as a reinforcing member.

The annular rubber block 54 has a radially outward protruding portion integrally formed at a circumferential portion thereof. This radially outward protruding portion serevs as a partition wall 56. More specifically, the partition wall 56 has a given circumferential length and protrudes radially outwardly by a given radial distance so that the radially protruding end face of the partition wall 56 is substantially aligned with the outer circumferential surface of the positioning stepped portion 48, in the axial direction. The partition wall 56 has a constant axial length that is similar to that of the annular rubber block 54. On one of opposite sides of the partition wall 56, the wall-thickness of the annular rubber block 54 is reduced over a predetermined circumferential distance so as to provide a communication groove 58. Thus, the annular rubber block 54 is substantially partially eliminated on the one side of the partition wall 56 to provide the communication groove 58. On the other side of the partition wall 56, there is formed a communication hole 60 through the annular bottom wall portion 50 of the partition plate 40. The annular rubber block 54 has sealing lips 62, 64 as integral parts thereof. The sealing lip 62 is formed on outer peripheral portion of the axially upper end face of the annular rubber block 54 so as to extend substantially continuously in the circumferential direction of the annular rubber block 54, except the circumferential portion of the annular rubber block 54 where the communication groove 58 is formed. The sealing lip 62 is formed at the axially upper end face of the partition wall 56 so as to extend continuously in the radial direction of the partition wall 56.

Figure 6:
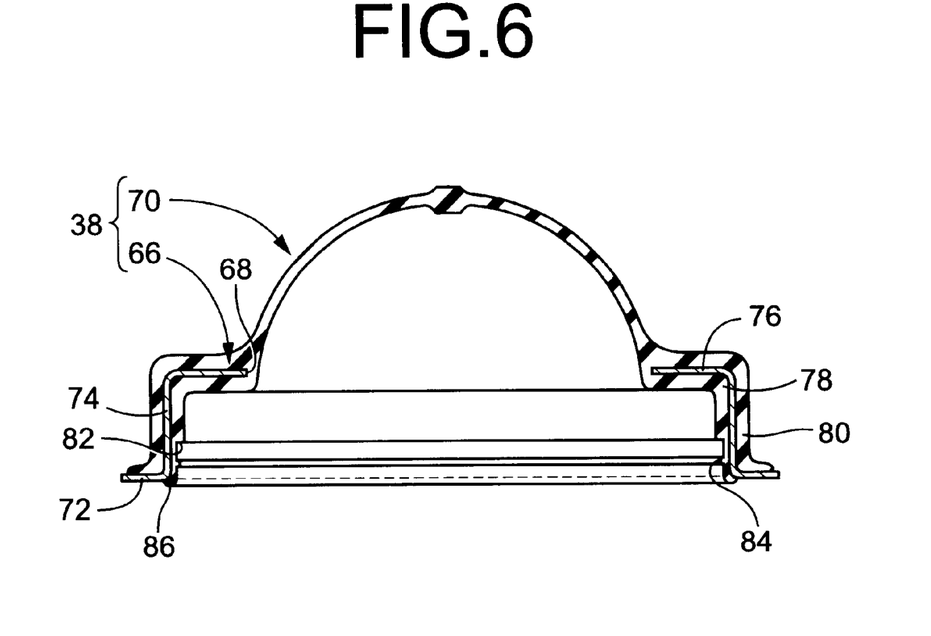
FIG. 6 is an elevational view in axial cross section of a closure member used in the engine mount of FIG. 1.

Referring next to FIG. 6, the closure member 38 consists of a closure metallic member 66 and a flexible rubber layer 70 adapted to close a central through hole 68 of the closure metallic member 66, which will be described later. The outer peripheral portion of the closure metallic member 66 serves as an outward flange portion 72 having an annular plate-like shape. The inner peripheral portion of the outward flange portion 72 is bent at a substantially right angle so as to protrude axially outward or upward direction, thereby providing an outer cylindrical wall portion 74 having a cylindrical shape. The protruding end portion of the outer cylindrical wall portion 74 is bent at a substantially right angle so as to extend radially inward direction, thereby providing an annular top wall portion 76 having a relatively large width, as a annular plate portion. The inner peripheral portion of the annular top wall portion 76 defines the above-mentioned central through hole 68 of the closure metallic member 66. The outer cylindrical wall portion 74 is arranged to have an inner diameter which is slightly larger than the outer diameter of the positioning stepped portion 48 of the partition plate 40, and is also arranged to extend in the axially outward direction with an axial dimension which is larger than the sum of the axial dimensions of the positioning stepped portion 48 and the cylindrical inner wall portion 52 of the partition plate 40.

The flexible rubber layer 70 generally has a thin-walled dome-like configuration with a generally constant wall-thickness. The flexible rubber layer 70 is open toward the partition member 36. The circumferential open-end portion of the flexible rubber layer 70 is bonded to the annular top wall portion 76 of the closure metallic member 66 in the process of vulcanization for forming the flexible rubber layer 70. The inner and outer circumferential surfaces of the outer cylindrical wall portion 74 and the annular top wall portion 76 are covered, over their substantially entire area, by an inside sealing rubber layer 78 and an outside sealing rubber layer 80, respectively. The inside and outside sealing rubber layers 78, 80 are integrally formed with the flexible rubber layer 70 and formed on and bonded to the respective inner and outer circumferential surfaces of the outer cylindrical wall portion 74 and the annular top wall portion 76. The inside sealing rubber layer 80 has a shoulder 82 at an axially intermediate portion thereof, and include a small-diameter portion on the upper side of the shoulder 82 and a large-diameter portion on the lower side of the shoulder 82. The large-diameter portion of the inside sealing rubber layer 78 has an first annular sealing lip 84 integrally formed thereon and protrude radially inwardly therefrom, and a second annular sealing lip 86 formed integrally on and axially outwardly from the axial end face of the closure metallic member 66.

That is, the partition member 36 and the closure member 38 are formed as intermediate integral vulcanized products of the movable rubber plate 44 and the flexible rubber layer 70, respectively. As is apparent from FIG. 1, the closure member 38 is superposed on and assembled to the partition member 36 in their axial directions, such that the outward flange portion 46 of the partition plate 40 and the outward flange portion 72 of the closure metallic member 66 are butted to each other. Thus assemble partition and closure members 36, 38 are superposed on the shoulder 28 of the outer mounting member 14. The outer mounting member 14 is calked at its axially end portions against the outward flange portions 46, 72 of the partition and closure members 36, 38. In this manner, the partition member 36 and the closure member 38 are firmly fixed to the axially upper open-end portion of the outer mounting member 14.

With the partition member 36 and the closure member 38 firmly fixed to the outer mounting member 14, the upper open end of the outer mounting member 14 is fluid tightly close by these two members 36, 38. In the thus constructed elastic mount 10, the elastic body 16 and the flexible rubber layer 70, which are adapted to fluid-tightly close the upper and lower open ends of the outer mounting member 14, respectively, cooperate with the outer mounting member 14 to define a fluid-chamber 88 filled with a suitable non-compressible fluid. In this condition, the partition member 36 is disposed within the fluid chamber 88 so as to extend in the direction perpendicular to the axial direction of the engine mount 10. Thus, the partition member 36 divides the fluid chamber 88 into two sections on the axially opposite sides thereof, namely, a pressure receiving chamber 90 partially defined by the elastic body 16 and an equilibrium chamber 92 partially defined by the flexible rubber layer 70. Upon application of the vibration between the inner and outer mounting members 12, 14, the pressure of the fluid in the pressure-receiving chamber 90 varies due to elastic deformation of the elastic body 16, while the volume of the equilibrium chamber 92 is permitted to vary by displacement of the flexible rubber layer 70.

The filling of the fluid chamber 88 with the non-compressible fluid is advantageously conducted by assembling the partition member 36 and the closure member 38 with respect to the intermediate product 32 constituted by the inner and outer mounting members 12, 14 the elastic body 16, in a mass of the selected non-compressible fluid. The non-compressible fluid filling the fluid chamber 88 preferably has a viscosity of not higher than 0.1 Pa.s., and may be preferably selected from among water, alkylene glycol, polyalkylene glycol and silicone oil, for instance, for enabling the engine mount 10 to exhibit an excellent vibration damping effect on the basis of resonance of the fluid as described below in detail.

With the partition member 36 and the closure member 38 assembled with each other as described above, the inner circumferential surface of the annular top wall 76 of the closure member 38 is forcedly fitted onto the outer peripheral portion of the annular rubber block 54 of the partition member 36 via the inside sealing rubber layer 78 interposed therebetween. In this condition, the annular rubber block 54 of the closure member 38 and the outer cylindrical wall portion 74 of the partition member 36 are opposed to each other in the radial direction of the elastic mount 10 with a given radial spacing therebetween, and cooperate to each other to partially define therebetween an annular passage 94 extending in their circumferential direction. In the thus constructed annular passage 94, the partition wall 56 is held in close contact at its radially outer circumferential surface with a corresponding circumferential portion of the outer cylindrical wall portion 74 via the inside sealing rubber layer 78 compressed therebetween. The partition wall 56 is also held in close contact at its axially upper end face with the annular top wall portion 76 of the closure member 38 via the inside sealing rubber layer 78 compressed therebetween.

Thus, the annular passage 94 is intercepted in the circumferential direction thereof at the circumferential portion thereof where the partition wall 56 is formed.

On the opposite sides of the partition wall 56, there are suitably positioned the communication hole 60 and the communication groove 58, respectively, so that the annular passage 94 communicates at its one of opposite end with the pressure-receiving chamber 90 through the communication hole 60 and at the other end with the equilibrium chamber 92 through the communication groove 58. Therefore, the annular passage 94 serves as an orifice passage 96 for fluid communication between the pressure-receiving chamber 90 and the equilibrium chamber 92, which is formed at the outer peripheral portion of the partition member 36 so as to extend in the circumferential direction of the partition member 36 with a circumferential length which is slightly smaller than the circumference of the partition member 36. As is apparent from the above-mentioned description with respect to the present embodiment, the engine mount 10 includes the communication hole 60 serving as a first communication hole, and the communication groove 58 serving as a second communication hole.

Upon assembling the partition and closure members 36, 38 with each other, the outer cylindrical wall portion 74 of the closure metallic member 66 is press-fitted onto the positioning stepped portion 48 of the partition plate 40. This makes it possible to suitably position the partition and closure members 36, 38 relative to each other in their diametric directions, and to prevent undesirable displacement of these members 36, 38 relative to each other in their diametric directions. When the partition and closure members 36, 38 which are assembled with each other as described above, the inner surface of the inside sealing rubber layer 78 fixed onto the annular top wall portion 76 of the closure member 38 protrudes axially downwardly from the axially upper end face of the annular rubber block 54 of the partition member 36. Therefore, the inner surface of the inside sealing rubber layer 78 is forcedly pressed onto the upper end face of the annular rubber block 54 with the outward flange portions 46, 72 of the partition and closure members 36, 38 being fixed by calking to the outer mounting member 14, thereby assuring a fluid tightness of the orifice passage 96 with respect to the equilibrium chamber 92, effectively.

Further, the positioning stepped portion 48 of the partition plate 40 is arranged to have its outside diameter which is made slightly smaller than the inside diameter of the outer cylindrical wall portion 74 of the closure metallic member 66, and which is made slightly larger than the inside diameter of the inside sealing rubber layer 78 bonded to the inner surface of the outer cylindrical wall portion 74. In this arrangement, the outer cylindrical wall portion 74 of the closure metallic member 66 is forcedly press-fitted onto the positioning stepped portion 48 of the partition plate 40 with the inside sealing rubber layer 78 compressed therebetween, permitting a stable positioning of the partition plate 40 and the closure metallic member 66 and a fluid-tight sealing between the positioning stepped portion 48 and the outer cylindrical wall portion 74 with the inside sealing rubber layer 78 being compressed therebetween.

In addition, the partition wall 56 of the partition member 36 is arranged to have an outside diameter which is made slightly smaller than the inside diameter of the outer cylindrical wall portion 74 of the closure metallic member 66, and which is made slightly larger than the inside diameter of the inside sealing rubber layer 78 bonded to the outer cylindrical wall portion 74. Therefore, the outer cylindrical wall portion 74 of the closure metallic member 66 is forcedly press-fitted onto the outer circumferential surface of the partition wall 56 in the diametric direction with the inside sealing rubber layer being compressed therebetween. The partition wall 56 of the partition member 36 is also arranged such that the axially upper end face of the partition wall 56 protrudes axially upwardly from the inner surface of the inside sealing rubber layer 78 bonded to the annular top wall 76 of the closure metallic member 66. In this arrangement, the annular top wall portion 76 of the closure metallic member 66 is forcedly press-fitted onto the axially upper end face of the partition wall 56 in the axial direction with the inside sealing rubber layer 78 being compressed therebetween.

As is apparent from the forgoing description, the partition member 36 and the closure member 38 can be assembled together with high positioning accuracy, by forcedly fitting the outer cylindrical wall portion 74 of the closure metallic member 66 onto the positioning stepped portion 48 of the partition plate 40 via the inside sealing rubber layer 78 compressed therebetween. This makes it possible to assure excellent fluid-tightness of the orifice passage 96, effectively preventing the conventionally experienced problem of undesirable communication of the both ends of the fluid passage. Accordingly, the engine mount 10 constructed according to the present embodiment can provide the orifice passage 96 having desired length and cross sectional area thereof with high stability.

Thus, the engine mount 10 of the present embodiment can exhibit the desired vibration damping effect with respect to the vibrations within a predetermined frequency band with high stability, owing to the resonance of the fluid flowing through the orifice passage 96 that is tuned to the predetermined frequency band. In this respect, the orifice passage 96 partially defined by the outer circumferential surface of the annular rubber block 54 of the partition member 36 and the outer cylindrical wall 74 of the closure member 38 which are disposed in coaxial relationship with each other with a predetermined radial spacing therebetween, and which extend parallel to each other in the axial direction. This makes it possible to obtain a sufficiently large cross sectional area of the orifice passage 96 with high efficiency, permitting a sufficiently large amount of the fluid to flow through the orifice passage 96, resulting in the desired vibration damping effect with improved efficiency.

In the engine mount 10 constructed according to the present embodiment, the movable rubber plate 44 closing the central opening 42 of the partition plate 40 is disposed between the pressure receiving chamber 90 and the equilibrium chamber 92 such that the movable rubber plate 44 partially defines at its axially upper surface the pressure receiving chamber 90 and at its axially lower surface the equilibrium chamber 92. Upon application of high-frequency vibrations to the engine mount 10, the movable rubber plate 44 is elastically deformed to reduce or absorb the pressure change of the fluid in the pressure-receiving chamber 90, effectively avoiding a significant increase in the dynamic spring constant or spring stiffness with respect to the high-frequency vibrations. Thus, the engine mount 10 can also exhibit the desired vibration damping effect with respect to the high-frequency vibration that cannot be effectively damped based on the fluid flows through the orifice passage 96, since the fluid is kept from flowing through the orifice passage 96 upon application of the high-frequency vibration. For instance, the orifice passage 96 may be tuned to the low-frequency vibrations such as an engine shake. In this case, the engine mount 10 exhibits an excellent vibration damping effects with respect to the low-frequency vibrations based on the resonance of the fluid flowing through the orifice passage 96, while exhibiting a vibration isolating effect with respect to the high-frequency vibrations such as booming noises, based on the elastic deformation of the movable rubber plate 44 for reducing or absorbing the pressure change of the fluid in the pressure receiving chamber 90.

While the present invention has been described in its presently preferred embodiment, it is to be understood that the invention is not limited to the details of the illustrated embodiment, but may be otherwise modified.

Figure 7:
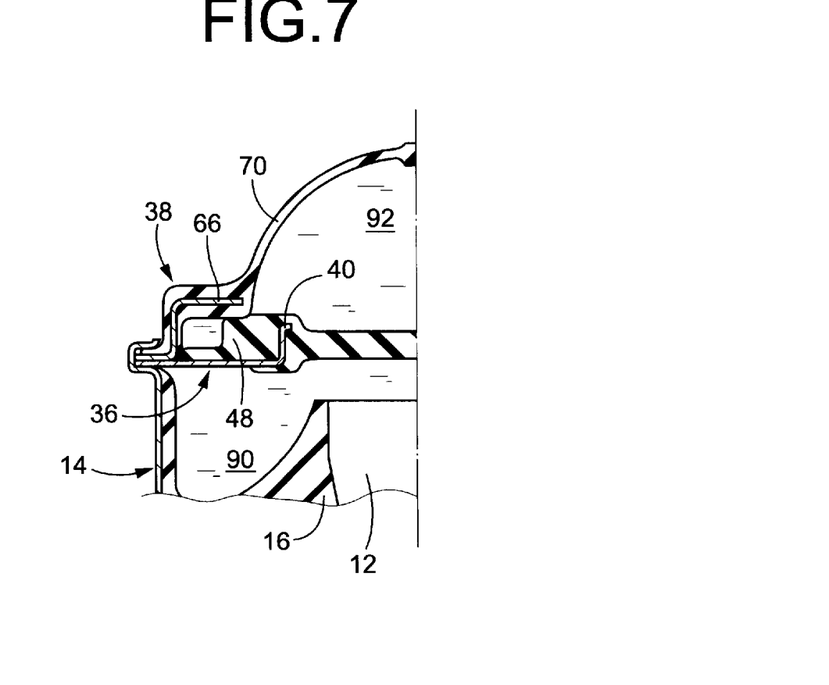
FIG. 7 is a fragmentally view in axial cross section showing one modification of the partition member used in the engine mount of FIG. 1.
Figure 8:
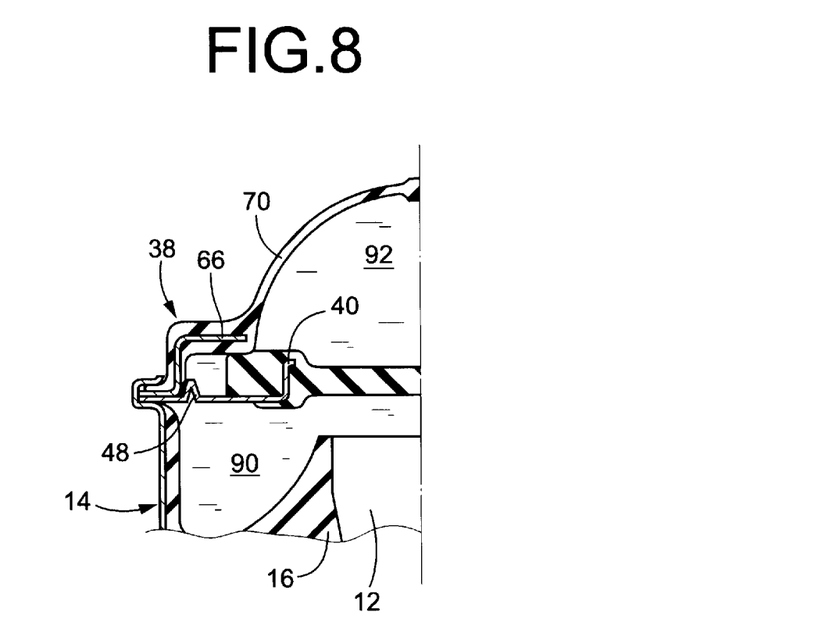
FIG. 8 is a fragmentally view in axial cross section showing a another modification of the partition member used in the engine mount of FIG. 1.

While the positioning stepped portion 48 is integrally formed with the metallic partition plate 40 in the illustrated embodiment, such a positioning stepped portion may be formed of a rubber material, as shown in FIG. 7. Further, the positioning stepped portion 48 integrally formed with the metallic partition plate 40 may be modified to have various configurations including a rib-like shape as shown in FIG. 8.

Further, the movable rubber plate 44 is not essential to practicing the present invention, but may be employed as needed, taken into account required vibration damping characteristics of the elastic mount.

Figure 9:
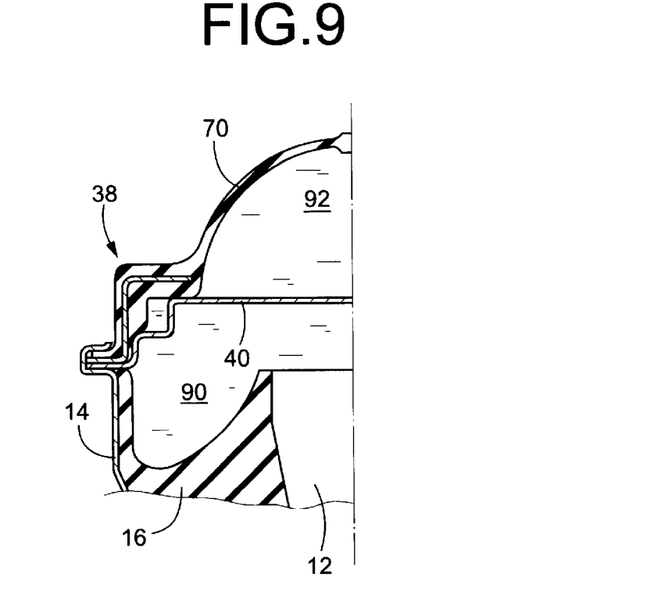
FIG. 9 is a fragmentally view in axial cross section showing a yet another modification of the partition member used in the engine mount of FIG. 1.
Figure 10:
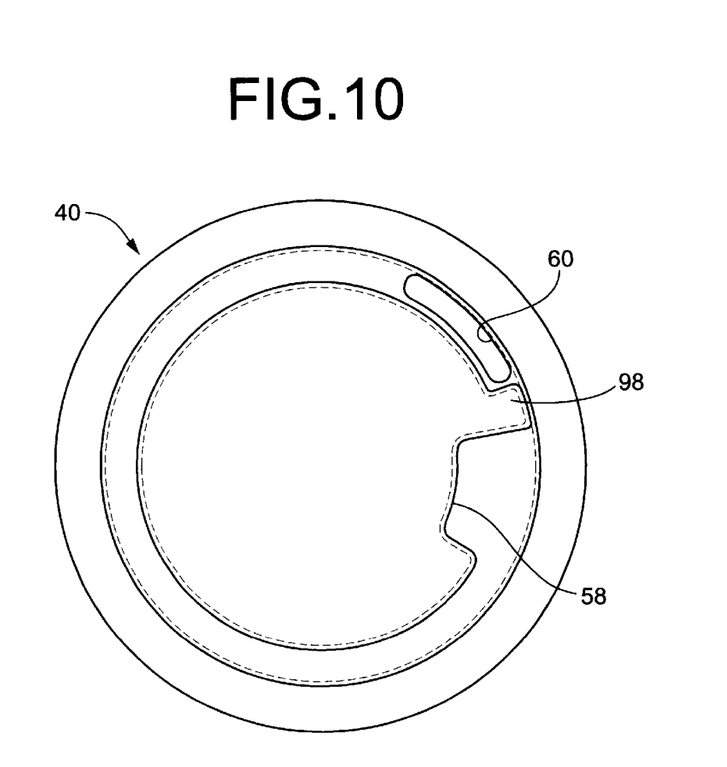
FIG. 10 is an elevational plane view of the partition member of FIG. 9.

The construction and material of the partition wall 56 is not particularly limited to the illustrated embodiment, but may be otherwise embodied. For instance, it is possible to provide a partition wall 98 which is integrally formed with the metallic partition plate 40 with the configuration similar to the illustrated partition wall 56 as illustrated in FIGS. 9 and 10. In this case, the annular rubber block 54 may also be integrally formed with the metallic partition plate 40. The communication groove 58 may also be integrally formed with the metallic partition plate 40. If the movable rubber plate 44 is not needed and if the partition wall 56 and the annular rubber block 54 are both integrally formed with the metallic partition plate 40, the partition member 36 is solely constituted by the metallic partition plate 40.

The closure member 38 may further include a covering member adapted to cover the outer surface of the flexible rubber layer 70, for a protection of the flexible rubber layer 70.

In the illustrated embodiment, the present invention is applied to the engine mount 10 where the power unit is suspended from and elastically supported by the outer mounting member 14 in the vibration isolating fashion. The present invention may be applicable to another type of engine mount where the power unit is placed on and supported by the body of the vehicle in the vibration isolating fashion.

While, the illustrated embodiment of the invention takes the form of a fluid-filled engine mount for a motor vehicle, it is to be understood that the principle of the invention is equally applicable to body mounts for automotive vehicles, and the other types of fluid-filled elastic mounts for various machines and other equipment other than automotive vehicles.

It is to be understood that the present invention may be embodied with various other changes, modifications, and improvement which may occur to those skilled in the art, without departing from the spirit and scope of the invention defined in the following claims:

What is claimed is:

1. A fluid-filled elastic mount including (a) a first mounting member and a generally cylindrical second mounting member, which are spaced apart from each other in an axial direction of said second mounting member, (b) an elastic body elastically connecting said first and second mounting members so as to fluid-tightly close one of axially opposite open ends of said second mounting member, (c) a partition member made of metal and extending in a direction perpendicular to said axial direction, (d) a closure member made of metal and having a central through hole and a flexible diaphragm fluid-tightly closing said central through hole, said partition member and said closure member being superposed on each other and fixed at their peripheral portions to the other of axially opposite open ends of said second mounting member, by calking, so as to provide on one of opposite sides of said partition member a pressure receiving chamber which is partially defined by said elastic body and filled with a non-compressible fluid, and on the other of opposite sides of said partition member an equilibrium chamber which is partially defined by said flexible diaphragm and filled with the non-compressible fluid, and (e) an orifice passage for fluid communication between said pressure receiving chamber and said equilibrium chamber, said orifice passage being formed between said partition and closure members so as to extend in a circumferential direction of said partition and closure members, wherein an improvement comprises:

said partition member including an axial protrusion formed at a radially intermediate portion thereof and having an outer circumferential surface extending in said circumferential direction thereof, and a cylindrical positioning shoulder located radially inwardly of said peripheral portion thereof, said closure member including an integrally formed cylindrical wall portion located radially inwardly of and protruding axially outwardly from said peripheral portion thereof, and an integrally formed annular plate portion extending radially inwardly from a protruding open end portion of said cylindrical wall portion, said partition and closure members being superposed on each other such that said cylindrical wall portion of said closure member is partially press-fitted onto an outer circumferential surface of said cylindrical positioning shoulder of said partition member so as to be positioned relative to said partition member in a diametric direction thereof, and that the annular plate portion of said closure member being superposed at an inner peripheral portion thereof on a protruding end face of said axial protrusion of said partition member to thereby provide an annular passage partially defined by and circumferential extending between said cylindrical wall portion of said closure member and said axial protrusion of said partition member which are opposed to each other in said diametric direction, said annular passage including a partition wall formed at a circumferential portion thereof, said partition wall protruding radially outwardly from the side of said partition member toward the side of said closure member such that said partition wall is elastically pressed against the side of said closure member to thereby fluid tightly intercept said annular passage in a circumferential direction thereof; and said annular passage being held in fluid communication with said pressure receiving chamber through a first communication hole formed on one of circumferentially opposite sides of said partition wall and with said equilibrium chamber through a second communication hole formed on the other side of said partition wall, to serve as said orifice passage.

2. A fluid-filled elastic mount according to claim 1, wherein said partition and closure members are pressed against each other by an axial compression force caused by said calking, which force acts on the interfaces between an axially protruding end face of said partition wall and the annular plate portion of the closure member so that the partition wall of the partition member is held in elastically pressing contact at its axially protruding end face with said annular plate portion of said closure member.

3. A fluid-filled elastic mount according to claim 1, wherein, said first and second communication holes are formed on the side of said partition member.

4. A fluid-filled elastic mount according to claim 3, wherein said first communication hole is constituted by a through hole formed through said partition member, which is located on one of opposite sides of the partition wall in the circumferential direction and is located radially inwardly of said positioning shoulder, and said second communication hole is constituted by a small-diameter portion of the annular protrusion located on the other side of the partition wall.

5. A fluid-filled elastic mount according to claim 1, wherein said cylindrical positioning shoulder is integrally formed with said partition member.

6. A fluid-filled elastic mount according to claim 1, wherein said cylindrical positioning shoulder is formed of a rubber material.

7. A fluid-filled elastic mount according to claim 1, wherein said partition and closure member are both formed of metal by pressing.

8. A fluid-filled elastic mount according to claim 1, wherein said partition member further includes a central through hole and an elastic movable plate fluid-tightly closing said through hole, said elastic movable plate being elastically deformable based on a fluid pressure difference between said pressure receiving chamber and said equilibrium chamber, said fluid pressures of said pressure receiving and equilibrium chambers act on opposite surfaces of said movable rubber plate, respectively.

9. A fluid-filled elastic mount according to claim 1, wherein said axial protrusion of said partition member is formed of a rubber material, and said partition wall is integrally formed with said axial protrusion.

10. A fluid-filled elastic mount according to claim 9, wherein said axial protrusion includes a reinforcing member embedded therein, said reinforcing member being formed as an integral part of said partition member.

11. A fluid-filled elastic mount according to claim 1, further comprising a sealing rubber layer which is bonded to an inner circumferential surfaces of said cylindrical wall portion and said annular plate portion of said closure member, and which is integrally formed with said flexible diaphragm, said closure member being press-fitted at said cylindrical wall portion thereof to said cylindrical positioning shoulder of said partition member via said sealing rubber layer, and being press-fitted at said annular plate portion thereof to the protruding end face of said axial protrusion of said partition member via said sealing rubber layer, said partition wall of said partition member being pressed against said closure member via said sealing rubber layer.

12. A fluid-filled elastic mount according to claim 1, wherein said positioning shoulder has a generally cylindrical outer circumferential surface extending in the axial direction with a generally constant diameter, and has a rounded edge at a protruding end face thereof.

13. A fluid-filled elastic mount according to claim 1, wherein said cylindrical positioning shoulder has a tapered outer circumferential surface extending in the axial direction with a diameter gradually reduced in the axially extending direction thereof.

14. A fluid-filled elastic mount according to claim 1, wherein an outer circumferential surface of said partition wall is positioned not to protrude radially outwardly from an outer circumferential surface of said cylindrical positioning shoulder, and said cylindrical wall portion includes a local portion adapted to contact with the outer circumferential surface of said partition wall and protruding radially inwardly from the outer circumferential surface of said cylindrical positioning shoulder so as to be elastically pressed against the outer circumferential surface of said partition wall in the radial direction thereof.

* * * * *

UNITED STATES PATENT AND TRADEMARK OFFICE
CERTIFICATE OF CORRECTION

PATENT NO.    : 6,390,458 B2
DATED         : May 21, 2002
INVENTOR(S)   : Okanaka et al.

It is certified that error appears in the above-identified patent and that said Letters Patent is hereby corrected as shown below:

<u>Title page,</u>
Item [54], Title, please insert -- AND -- preceeding the word "EXHIBITS".

Item [56], References Cited, please delete the following references:

"5,171,214 A;
5,368,578 A;
5,482,176 A;
5,718,346 A;
5,755,712 A;
5,807,346 A;
5,817,082 A;
5,879,345 A;
5,890,610 A;
5,891,129 A;
5,895,383 A;
5,902,298 A;
5,919,182 A;
5,921,996 A;
5,989,227 A"

Please insert the following reference:

-- 6,053,487  A  4/2000  Yotani   267/140.11 --

Signed and Sealed this

Nineteenth Day of November, 2002

*Attest:*

*Attesting Officer*

JAMES E. ROGAN
*Director of the United States Patent and Trademark Office*